July 3, 1928.
T. F. MORSE
1,675,572
SEPARATING MACHINE
Filed May 14, 1923    2 Sheets-Sheet 1
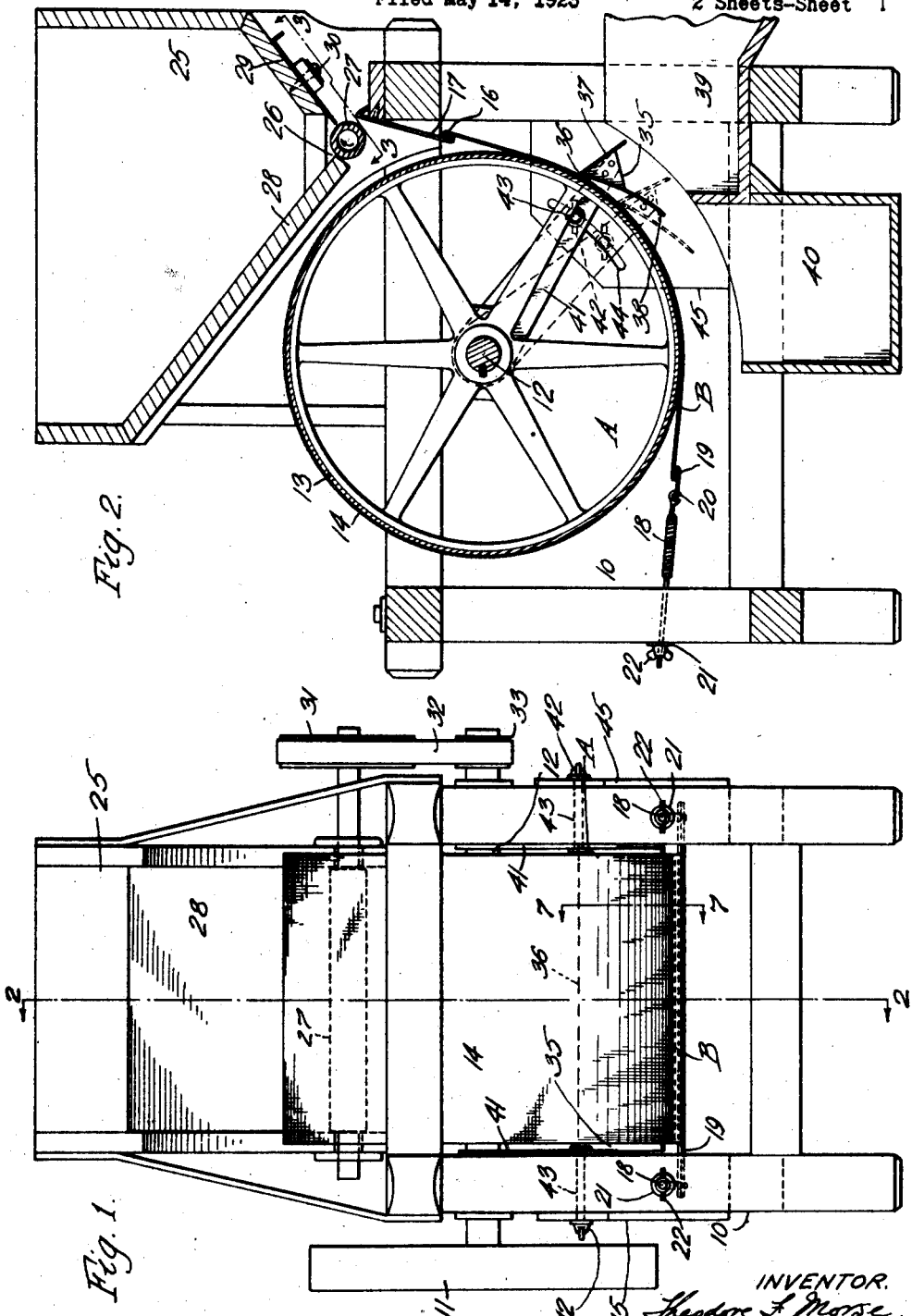
INVENTOR.
Theodore F. Morse,
by Parker & Rockwood.
ATTORNEYS.

July 3, 1928.
T. F. MORSE
SEPARATING MACHINE
Filed May 14, 1923
2 Sheets-Sheet 2
1,675,572
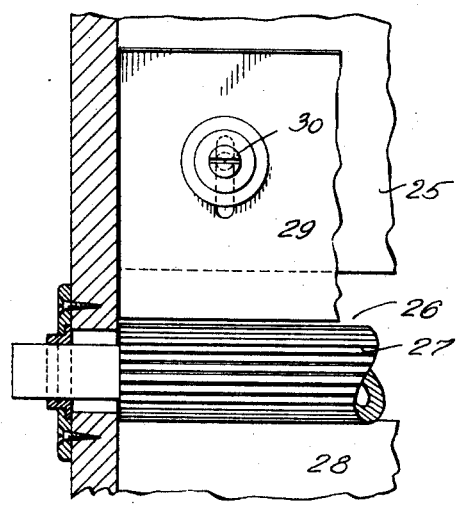
Fig. 3.
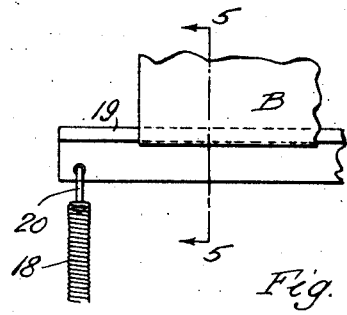
Fig. 4.
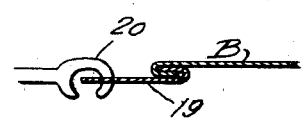
Fig. 5.
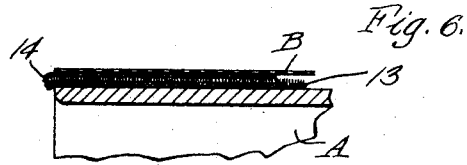
Fig. 6.
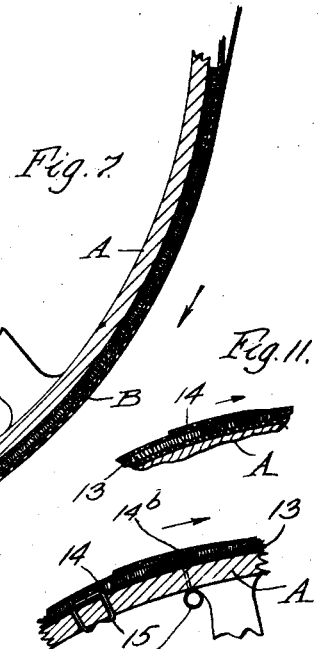
Fig. 7.
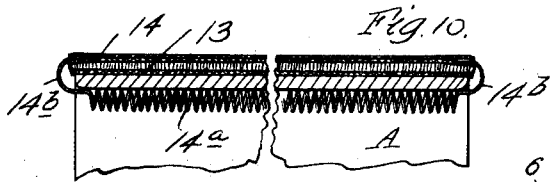
Fig. 10.
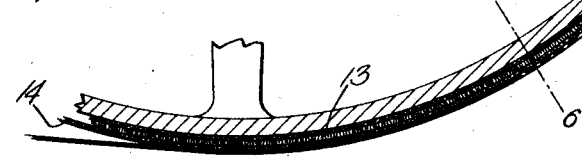
Fig. 11.
Fig. 8.
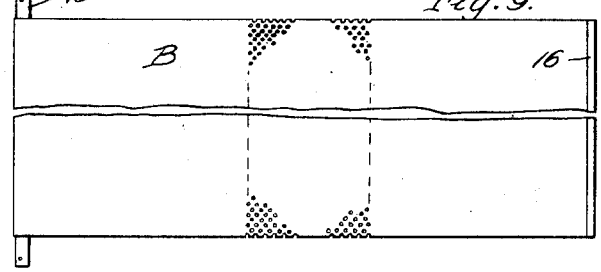
Fig. 9.
INVENTOR.
Theodore F. Morse
by Parker Brockwow.
ATTORNEYS.

Patented July 3, 1928.

1,675,572

UNITED STATES PATENT OFFICE.

THEODORE F. MORSE, OF SILVER CREEK, NEW YORK, ASSIGNOR TO HUNTLEY MANUFACTURING CO., OF SILVER CREEK, NEW YORK.

SEPARATING MACHINE.

Application filed May 14, 1923. Serial No. 638,688.

This invention relates to improvements in separating or cleaning machines, and more particularly to a machine for the purpose of separating from each other materials such as seeds or grains which differ in shape or character of surfaces. For instance, the machine is adapted for separating buckhorn seeds from clover seeds, for separating wheat from oats or for separating from each other substantially spherical or regular shaped seeds or grains and seeds or grains which are longer in one direction or are of more irregular shape, but which have one dimension substantially alike so that the irregular and regular shaped seeds could pass through the same screen openings provided the elongated or irregular shaped seeds were permitted to assume an endwise position with their smaller ends presented to the screen openings.

The primary object of my invention is to produce a practical machine of simple and inexpensive construction for separating materials of the kind mentioned, which will be efficient and reliable in operation and adapted to thoroughly separate from each other seeds, grains or particles which differ in shape. Other objects of the invention are to construct the machine so that the perforated separating plate or element can be readily placed in position and removed and quickly replaced by another plate having perforations of a different size to adapt the machine for operation upon different seeds or grains of different sizes or kinds, and so that the yielding covering of the cylinder which cooperates with the separating plate can be easily applied and renewed; also to arrange and mount the separating plate so that it will be held taut and smooth against the cylinder with the required tension, which can be readily adjusted as may be necessary; also to construct and arrange the separating plate and cylinder so that they will cooperate with each other to retain the cylinder covering intact and smooth on the cylinder and maintain a smooth, even contact of the plate with the cylinder; also to provide adjustable means cooperating with the separating plate for deflecting to different places materials or seeds of different kinds or grades passing through different areas of the perforated separating plate; and also to improve separating machines of the character mentioned in the other respects hereinafter described and set forth in the claims.

A separating machine according to my invention comprises a rotating drum or cylinder and a flexible, perforated separating plate, screen or element which partially surrounds and presses upon the periphery of the rotating cylinder in such manner that the seed or material to be separated can be fed in a thin layer between the cylinder and plate and will be carried along between the cylinder and plate by the rotation of the cylinder, the round or regular shaped seeds or grains being adapted to pass through the perforations in the plate, while the elongated or irregular shaped seeds or grains are held flat against the perforated plate so as to be prevented from passing through the perforations in the plate but caused to travel over the perforations of the plate, being thus separated from the round or regular shaped seeds or grains and discharged at a different point.

In the accompanying drawings:

Fig. 1 is a rear elevation of a separating machine embodying my invention.

Fig. 2 is a longitudinal sectional elevation thereof on line 2—2, Fig. 1.

Fig. 3 is an enlarged sectional elevation of the feed device on line 3—3, Fig. 2.

Fig. 4 is a fragmentary plan view, enlarged, of the rear end of the separating plate and its tensioning means.

Fig. 5 is a section thereof on line 5—5, Fig. 4.

Fig. 6 is a section of the separating cylinder and plate on line 6—6, Fig. 7.

Fig. 7 is a section of the separating cylinder and plate, on an enlarged scale, on line 7—7, Fig. 1.

Fig. 8 is a fragmentary section of the cylinder showing the manner of securing the yielding covering and flexible material thereon.

Fig. 9 is a fragmentary plan of the perforated separating plate detached.

Fig. 10 is a fragmentary transverse section showing the means used for releasably retaining the end of the flexible covering on the cylinder.

Fig. 11 is a fragmentary section of the cylinder showing the overlapping disconnected ends of the flexible covering.

A represents the rotary drum or cylinder and B the perforated flexible separating plate or screen.

The cylinder is suitably journalled to rotate on a frame 10 which may be of any suitable construction, the cylinder being driven by any suitable means, as for instance, by a belt running on a pulley 11, secured to one end of a bearing shaft 12 for the cylinder. The cylinder is preferably made of metal or other suitable rigid material, but is provided with a yielding or cushioned peripheral surface, preferably formed by a layer of carpet or analogous, relatively thick, yielding material 13, and a superposed or outer wrapper or cover of duck, canvas or analogous textile material 14, the kind of material depending upon the kind of grains or seeds being separated. As a rule, it is desirable to use a relatively heavy, stiff material when separating large seeds and a finer and more flexible material when separating very small seeds. The carpet or cushioning layer 13 is stretched smoothly around the periphery of the cylinder with its ends abutting so as to form a butt joint, and is suitably secured on the cylinder, as for instance, by wire or other stitching 15 passing through the butting ends of the carpet and through holes provided for this purpose in the cylinder. The outer wrapper or cover 14 is of relatively heavy material, such as canvas or duck and is preferably simply wrapped loosely around the cylinder outside of the cushioning layer 13 with its ends overlapping in such a direction that in the rotation of the cylinder the contact of the cover 14 with the separating plate B will keep the wrapper or cover smooth and taut on the cylinder by reason of the tendency of the wrapper to roll tighter on the cylinder, see Fig. 11. If, however, it is desired to separate very small seeds, a more flexible and soft material, such as denim or the like is used. In this case, it may be desirable to provide means for securing, at least temporarily, the front or leading edge of the material to the cylinder A, as until the machine has been in operation for a short time, the relatively soft material is liable to crawl laterally, or wrinkle on the cylinder, as it is somewhat difficult to accurately lay such material on the cylinder. The means shown in the drawings comprises a flexible member, such as the coil spring 14$^a$, adapted to be extended across the inner face of the cylinder and having its hooked ends 14$^b$ brought outwardly into engagement with the front corners of the material 14, at the opposite edges of the cylinder. The lapped or rear edge of the material will extend over the other edge as before and will cover the ends 14$^b$ of the retaining device. Any other suitable means may be provided for releasably retaining the material 14 on the cylinder A.

The perforated plate or screen B is preferably provided at its front end with a hooked or bent-over edge 16 by which it is detachably engaged with a corresponding hooked edge on an attaching plate 17 which is fastened in any suitable manner to the stationary frame 10 of the machine at the front side of the cylinder, and the perforated plate B passes downwardly from the attaching plate 17 partially around the underside of the cylinder and is connected at its rear end to tensioning springs 18 which are suitably attached to the frame 10 of the machine so that they tend to draw the perforated plate taut against the contacting portion of the cylinder. Preferably the rear end of the perforated plate is folded under to form a hooked edge which is adapted to engage a complementary hook on a bar 19 to which the tensioning springs 18 are connected, as by hooks 20, see Fig. 5, and the springs 18 are provided at their outer ends with rods or extensions which pass through the bearing plates 21 on the frame 10, and have thumb nuts 22 screwed on their threaded ends and engaging the bearing plates 21 for fastening the springs to the frame of the machine. The tension of the springs can be adjusted by means of these nuts so as to hold the perforated plate with the requisite pressure against the yielding surface of the cylinder.

The upper or front end of the perforated plate and its attaching plate 17 extend tangentially out from the surface of the cylinder, or is separated therefrom by a gap or space into which the seeds or grains are fed in a thin layer from a suitable hopper or feed device. For this purpose, in the machine shown, a feed hopper 25 is provided at the upper front portion of the machine, having an opening 26 in its bottom through which the seed can discharge by gravity into the space between the cylinder and the separating plate. In order to regulate the discharge of the seed or grain and insure of the same being discharged in a thin layer or stream, a revolving feed roller 27 is provided in the discharge opening of the hopper between the inclined bottom board 28 of the hopper at one side of the discharge opening and a feed regulating valve or plate 29 which is adjustably secured to the inclined bottom of the hopper at the opposite side of the roll, and is adapted to be set so as to leave only a narrow gap or crack between the edge of the valve and the surface of the feed roller 27. The feed regulating valve can be adjustably secured on the hopper in any suitable manner, as for instance by clamping screws 30 passing through elongated slots in the valve. The feed roller can be driven by any suitable means, as for instance by a pulley 31 on one end of the feed roller shaft connected by a belt 32 to the pulley 33 on the shaft 12 of the separating cylinder A.

In the operation of the machine the feed roller feeds the mixed seeds or grains in a thin layer or stream into the spaced between the upper end of the separating plate B and the cylinder A, and this layer of seeds or grains is caused to travel between the cylinder A and the separating plate by the rotation of the cylinder. The feed of the seeds or grains should be regulated by appropriate adjustment of the regulating valve 29 so that the layer of seeds or grains will not be substantially deeper than the thickness of the thickest seeds or grains. In passing between the cylinder and the separating plate, the spherical or regular shaped seeds or grains, when they reach the perforations in the plate B, are adapted to fall through these perforations, or are pushed through the perforations by the pressure thereon of the yielding surface of the cylinder. The elongated or irregular shaped seeds or grains are held flat with their longer ends against the surface of the separating plate by the pressure of the cylinder thereon and are thus prevented from assuming an upstanding position with their small ends or dimensions presented to perforations in the plate, and are thus prevented from passing through the perforations. The elongated or irregular seeds or grains are thus carried on by the rotating cylinder past the perforated portion of the plate and discharged from the machine at a different point, for instance, over the end of the separating plate or screen, where they may be delivered into a suitable receptacle or conveyor to maintain them separated from the seeds or grains which pass through the perforations of the plate or screen and may fall into a different receptacle or conveyor. The plate is not perforated throughout but the perforations are confined to a comparatively restricted zone or area extending across the middle portion of the plate which contacts with the surface of the cylinder, the plate being imperforate in front and in rear of the perforated area. The perforations are round or similar in shape to the regular shaped seeds and only of sufficient size to permit the passage of these seeds.

The tensioning springs for the perforated plate or screen pull upon the latter in the same direction that the contacting portion of the cylinder travels so that the friction of the cylinder against the plate and the springs both tend to draw and hold the perforated plate taut and smooth against the surface of the cylinder. This construction insures a uniform contact and pressure of the plate throughout its perforated portion against the surface of the cylinder and prevents any undulations or unevenness in the plate which would prevent perfect separation of the material. The friction between the cylinder and the separating plate or screen also tends to wrap the loose cover tighter and smoother on the cylinder, as the rotation of the cylinder continues, always keeping it smooth and taut and preventing looseness or wrinkles in the cover or wrapper. Therefore, the cylinder always presents a yielding surface free from wrinkles or roughness to the contacting face of the perforated plate or screen, and the surface of the cylinder is thus always maintained intact in its proper position, and insures very efficient and reliable operation of the machine. When the wrapper or cover 14 becomes worn, it can be quickly and easily replaced, as it is only necessary to unwrap it from the cylinder and wrap a new piece around the cylinder in its place, it being unnecessary, as above indicated, to permanently secure or fasten the cover or wrapper on the cylinder. The separating plate or screen can be readily detached and removed by disengaging its opposite ends from the attaching plate 17 and the tensioning springs 18, and quickly and easily replaced by another plate having perforations of different size adapted for operating on a different material.

I have found that in the use of this separator the seeds or materials which it is intended shall pass through the perforations of the separating plate, vary in quality, that is there are sometimes more seeds of prime quality or more or less foreign matter in a given batch or mixture than at other times. The prime quality seed will pass first through the perforations of the separating plate in a layer of greater or less width circumferentially of the cylinder A, depending on the proportion of prime heavy seeds in the mixture, and the light, inferior seeds, together with fine foreign matter will then pass through the rear lines of the perforations. The reason for this separation of the seeds and their passage through the screen in two zones of variable width is that prime quality clover seeds, for example, in addition to being heavier than the inferior seed, are more plump and are round and smooth, while the inferior seeds are not only light, but are also wrinkled and are not so smooth and round. The smooth, large and round seeds will naturally be freed from the rough surface of the fabric on the cylinder before the inferior rough seeds which will tend to stick to this surface longer than said smooth seeds. Thus the best or prime seeds will first pass through the perforations of the screen. The same reasons apply to the separation of buckhorn seeds from clover seeds. Buckhorn seeds are rougher than clover seeds and have a small hook or tooth at one end which tends to cling to the fabric, thus retaining such seeds in contact with the cylinder for a longer period than the smooth clover seeds. It is desirable to separate these two grades of seeds or materials. For this purpose an adjustable divider 35 is provided which is preferably of the inverted V-shape, shown in Fig. 2, and is arranged with its apex 36 parallel with the axis of the cylinder A and against the underside of the separating plate B adjacent the perforations. The divider 35 may be adjusted nearer to or farther from the front line of perforations as may be found necessary after the relative proportions of the good and poor seeds or material are found. This may be ascertained by observing the point where the good seeds cease to pass through the perforations, and the divider 35 is then adjusted with its apex approximately at this point. The two diverging faces 37 and 38 of the divider will then divert the good seeds and the light seeds or foreign matter respectively into different receptacles 39, 40, or to different places thereby separating them.

Any suitable means may be provided for adjustably mounting and securing the divider 35 in its adjusted positions. As shown in the drawings, the opposite ends of the divider are connected to arms 41 arranged to swing on the shaft 12 so that the divider can be moved concentrically with the curved surface of the separating plate to different distances from the front line of perforations of the separating plate B. Thumb nuts 42 engaging laterally extending threaded rods 43 secured to the divider and passing through slots 44 in fixed plates 45 form suitable means for securing the divider 35 in its adjusted positions.

I claim as my invention:

1. In a separating machine for seeds and analogous material, the combination of a stationary frame, a rotating cylinder, a flexible plate which partially surrounds and contacts with the periphery of said cylinder and forms therewith a separating area throughout the length of contact between said cylinder and said plate one end of said plate being spaced from the cylinder to form an inlet to permit the material to be fed to said separating area between said plate and cylinder, quick detachable means for fastening said end of said plate to said frame, a floating connection between the opposite free end of said plate and said frame adapted to tension said plate and draw said plate taut against said cylinder, said connection comprising a strip having a bent-over edge adapted to hook into a corresponding portion on said free end of said plate, and tension springs each connected at one end to said frame at a distance from said plate and at the other end to said strip, and adjustable means on said frame for varying the tension of said springs, without disturbing the connection between the same and said strip.

2. In a separating machine for seeds and analogous material, the combination of a rotating cylinder, a flexible plate which partially surrounds and contacts with the periphery of the cylinder and is spaced therefrom at one end to permit the material to be fed between the cylinder and plate, and quick detachable tensioning means connected with the opposite end of the plate and acting to pull the plate taut against the cylinder in the direction of travel of that portion of the cylinder which contacts with the plate, said plate having perforations in a portion thereof which contacts with the cylinder through which perforations a portion of the material is adapted to pass for separating the same from the remaining material, said cylinder having a loose flexible covering which surrounds the same and cooperates with said plate to separate a portion of said material and force the same through said perforations, said covering having disconnected ends unattached to said cylinder and which is retained on said cylinder by overlapping said ends in a direction such that the contact of the plate with the covering tends to wrap the cover smoothly on the cylinder.

3. In a separating machine for seeds and analogous material, the combination of a rotating cylinder, a thin plate which partially surrounds and contacts with the periphery of the cylinder and is arranged to permit the entrance of the material between the cylinder and plate, means for holding the plate yieldingly in contact with the cylinder, said plate having perforations in a portion thereof which contacts with the cylinder through which perforations a portion of the material is adapted to pass, and a divider arranged to separate the material passing through different perforated areas of the plate and which has a thin edge adjacent said cylinder and extending transversely thereof and oppositely inclined faces for directing the separated portions of material away from each other, adjustable means for moving said divider to different positions relative to the perforated portion of the plate to vary its separating action and means for securing said divider in its different adjusted positions.

4. In a separating machine for seeds and analogous material, the combination of a rotating cylinder, a thin plate which partially surrounds and contacts with the periphery of the cylinder and is arranged to permit the entrance of the material between the cylinder and plate, means for holding the plate in contact with the cylinder, said plate having perforations in a portion thereof which contacts with the cylinder through which perforations a portion of the material is adapted to pass, and a divider arranged to separate the material passing through different perforated areas of the plate, an arm pivoted at one end on the axis of rotation of said cylinder and connected at its other end to said divider to permit the same to be adjusted concentrically with the curved portion of the plate to different positions to vary its separating action, and means for securing said divider in its different adjustments.

5. In a separating machine for seeds and analogous material, the combination of a rotating cylinder, a perforated plate which partially surrounds and contacts with the periphery of said cylinder and is spaced therefrom at one end to form an inlet to receive the material and permit the material to be fed between the contacting faces of said plate and the cylinder and means for pressing the plate yieldingly against the surface of the cylinder, said cylinder having a loose flexible covering which surrounds the same and engages the material as it passes between said cylinder and said plate, said covering having disconnected overlapping ends, and a resilient member extending across said cylinder inwardly beyond its periphery and having its ends formed to engage the leading end of said flexible covering under tension to releasably maintain said covering on said cylinder, said ends of said resilient member being concealed beneath the overlapping end of said cover.

THEODORE F. MORSE.